UNITED STATES PATENT OFFICE.

CARL BOSCH AND WILHELM WILD, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY.

PROCESS OF PRODUCING HYDROGEN.

1,113,097.      Specification of Letters Patent.      Patented Oct. 6, 1914.

No Drawing.      Application filed October 29, 1913. Serial No. 798,006.

*To all whom it may concern:*

Be it known that we, CARL BOSCH and WILHELM WILD, citizens of the German Empire, residing at Ludwigshafen-on-the-Rhine, Germany, have invented new and useful Improvements in Processes of Producing Hydrogen, of which the following is a specification.

It is stated in the specification of Patent No. 417,068 that hydrogen can be obtained by passing carbon monoxid and steam, either simultaneously or alternately, over nickel or metallic cobalt, but that the preferred method of carrying out the reaction consists in passing the two gases simultaneously, at the same time employing the least possible amount of nickel and cobalt, and with this object the aforesaid metals are spread on a non-metallic indifferent refractory and porous material, such for instance as pumice stone. We have found that we can carry out the said reaction of obtaining hydrogen in a much more favorable manner by passing carbon monoxid and steam over a new form of catalytic agent containing at least thirty per cent. of finely divided cobalt and not more than seventy per cent. of a non-metallic, indifferent, refractory and porous material, the said catalytic agent being porous and shaped into the form of blocks, such for instance as briquets, cubes, tubes, rods or the like. Under the term carbon monoxid we include both carbon monoxid itself and also gases containing it, such for instance as water-gas and generator-gas. Catalytic agents can be prepared from the finely divided cobalt with the employment of suitable diluents which may act as binding agents and may be either organic or inorganic in nature. Excellent results can be obtained by preparing an oxid, hydroxid or carbonate of cobalt, either by precipitation from solutions of its salts, or by heating suitable salts such for instance as the oxalate or nitrate, while avoiding too high a temperature, then molding the resulting products and, if necessary, heating before introduction into the reaction furnace. It is often advantageous to add such compounds as, upon heating, give rise to gas either by decomposition or by complete volatilization, since this tends to increase the porosity of the catalytic agent. The decomposition can be promoted by passing a gas or gases, such for instance as air, carbon dioxid, chimney gases or water-gas, over or through the mass. During the production or use of the catalytic agent, the cobalt may remain in the metallic state, or it may become more or less oxidized, or its condition may vary from time to time, consequently we regard the oxids as equivalent to the metal for the purposes of this invention.

The production of hydrogen by the aid of such catalytic agents can be carried out by adding an excess of steam to a gas containing carbon monoxid, such for instance as water-gas, or a gas of similar composition, and then passing the mixture of gases over the catalytic agent and subsequently removing the carbon dioxid formed. The action of the catalytic agent is very satisfactory at temperatures of about from $400°$ to $500°$ C. or even less down to $350°$ C., but temperatures above $650°$ C. should be avoided.

It is advisable to keep both the catalytic agent and the gases free from substances such as sulfur and chlorin which have a deteriorating action on the catalytic agent.

Much better results can be obtained when using the new form of catalytic agent according to our invention than is possible when following the directions given in the aforesaid Patent No. 417,068, and this could not have been foreseen, since, in the majority of catalytic reactions, such porous high percentage blocks have not been used. Thus, for the production of sulfur trioxid, the agent used consists of asbestos with finely divided platinum distributed over it, while, for oxidizing ammonia, the catalytic metal is employed in the form of wire netting; for hydrogenizing fats the metal is used in the form of powder or of a colloidal suspension. The new catalytic agents employed according to our invention, however, are characterized by not sintering when used and also by maintaining their shape and not breaking down to powder.

The following example will serve to illustrate the method of producing a catalytic agent and of producing hydrogen by its means, but we do not in any way restrict our invention to this example. The parts are by weight.

Mix together 10 parts of finely divided cobalt oxid (prepared by raising cobalt nitrate to a red heat), 1 part of calcined magnesia, and 2 parts by volume of a 50% magnesium nitrate solution. Press the mixture into small briquets, dry and heat up to 500° C. Place the briquets in a contact furnace and pass through it a mixture of water-gas with an excess of steam, while maintaining a temperature of about 500°C., and then extract the carbon dioxid from the resulting gases in any suitable manner.

The proportions given in the above example and also the materials employed can be varied considerably without departing from the nature of this invention.

In our application Serial No. 798,005 of even date we have shown that hydrogen can be obtained using nickel in a similar manner to that described in the present application when using cobalt. It is thus seen that cobalt and nickel are equivalent and therefore in the present invention a part of the cobalt may be replaced by nickel.

Now what we claim is:—

The process of producing hydrogen by passing carbon monoxid and steam, at a temperature between 350° C. and 650° C., simultaneously over a catalytic agent in lumps containing more than 30% of cobalt and a non-metallic, indifferent refractory and porous material.

In testimony whereof we have hereunto set our hands in the presence of two subscribing witnesses.

CARL BOSCH.
WILHELM WILD.

Witnesses:
  J. ALEC. LLOYD,
  S. S. BERGER.